United States Patent
Yamanoi et al.

(10) Patent No.: US 9,767,372 B2
(45) Date of Patent: Sep. 19, 2017

(54) TARGET DETECTION APPARATUS AND TARGET DETECTION METHOD

(71) Applicant: Nissan Motor Co., Ltd., Yokohama-Shi, Kanagawa (JP)

(72) Inventors: Daiki Yamanoi, Kanagawa (JP); Hidekazu Nishiuchi, Kanagawa (JP); Toshiyuki Andou, Kanagawa (JP); Hiroshi Satoh, Kanagawa (JP); Haruo Matsuo, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/311,250

(22) PCT Filed: May 20, 2014

(86) PCT No.: PCT/JP2014/063351
§ 371 (c)(1),
(2) Date: Nov. 15, 2016

(87) PCT Pub. No.: WO2015/177865
PCT Pub. Date: Nov. 26, 2015

(65) Prior Publication Data
US 2017/0177958 A1    Jun. 22, 2017

(51) Int. Cl.
*G06K 9/32* (2006.01)
*G06K 9/00* (2006.01)
(Continued)

(52) U.S. Cl.
CPC ......... *G06K 9/00825* (2013.01); *G01C 21/30* (2013.01); *G06K 9/00818* (2013.01);
(Continued)

(58) Field of Classification Search
CPC .............. B60R 21/0134; B60R 21/013; B60R 21/01538; B60R 2300/8093;
(Continued)

(56) References Cited

U.S. PATENT DOCUMENTS 4,792,907 A * 12/1988 Ikeda ..................... G01C 21/30
340/988
6,226,591 B1 * 5/2001 Okumura ............... G01C 21/28
701/409
(Continued)

FOREIGN PATENT DOCUMENTS

JP    2007241469 A    9/2007
JP    2007309757 A    11/2007
(Continued)

*Primary Examiner* — Sumati Lefkowitz
*Assistant Examiner* — Carol Wang
(74) *Attorney, Agent, or Firm* — Young Basile Hanlon & MacFarlane, P.C.

(57) ABSTRACT

A target detection apparatus acquires an image by imaging the surroundings of a vehicle, detects a self-position of the vehicle based on an amount of movement of the vehicle from an initial position thereof, and estimates a relative position of a target, located around the vehicle, with respect to the vehicle based on the self-position and information on a position of the target on a map. The target detection apparatus sets a detection area for the target within the image based on the relative position of the target with respect to the vehicle, and detects the target from the detection area. The target detection apparatus estimates error contained in the self-position based on the amount of movement of the vehicle from the initial position, and adjusts the size of the detection area for the target according to the error.

6 Claims, 10 Drawing Sheets

(51) Int. Cl.
    *G01C 21/30*     (2006.01)
    *G06T 7/73*     (2017.01)
    *G06K 9/20*     (2006.01)

(52) U.S. Cl.
    CPC ......... *G06K 9/2054* (2013.01); *G06K 9/3233* (2013.01); *G06T 7/74* (2017.01); *G06T 2207/30252* (2013.01)

(58) Field of Classification Search
    CPC ........... B60R 2300/301; B60T 2201/08; B60T 2201/022; B60T 8/17558; G06T 2207/30252; G06T 2207/30261; G06T 2207/30236; G06T 2207/30256; G06T 2207/30248; G06K 9/00624; G06K 9/00805; G06K 9/3241; G06K 9/00791; G06K 9/00825; G06K 9/00812; G06K 2209/15
    See application file for complete search history.

(56) References Cited

U.S. PATENT DOCUMENTS

| | | | |
|---|---|---|---|
| 8,134,480 | B2 | 3/2012 | Onome et al. |
| 8,311,274 | B2* | 11/2012 | Bergmann ............. G01C 21/30 382/103 |
| 2005/0225479 | A1* | 10/2005 | Shirai .................... G01S 13/867 342/70 |
| 2008/0018671 | A1* | 1/2008 | Miake .................... G01C 21/36 345/661 |
| 2008/0089557 | A1* | 4/2008 | Iwaki ....................... G01C 3/06 382/106 |
| 2009/0303077 | A1 | 12/2009 | Onome et al. |
| 2010/0061591 | A1 | 3/2010 | Okada et al. |
| 2012/0170808 | A1* | 7/2012 | Ogata ................. B60R 21/0134 382/103 |

FOREIGN PATENT DOCUMENTS

| | | |
|---|---|---|
| JP | 2008287572 A | 11/2008 |
| JP | 2009259215 A | 11/2009 |
| WO | 2005038402 A1 | 4/2005 |
| WO | 2008075438 A1 | 6/2008 |

\* cited by examiner

| | | POINT | | |
|---|---|---|---|---|
| ERROR IN COORDINATE AND ATTITUDE | | 51A | 51B | 51C |
| | gx | ±0.4 | ±0.4 | ±0.4 |
| | gy | ±0.1 | ±0.1 | ±0.1 |
| | gz | ±1 | ±1 | ±1 |
| | gp | ±3 | ±3 | ±3 |
| | gya | ±1 | ±1 | ±1 |
| | gr | ±3 | ±3 | ±3 |

FIG. 6C

| | | POINT | |
|---|---|---|---|
| COORDINATE AND ATTITUDE | | 51B | 51C |
| | x | 5 | 5 |
| | y | −5 | −5 |
| | z | −120 | −40 |
| | pitch | ±3 | ±3 |
| | yaw | ±1.9 | ±1.9 |
| | roll | ±3 | ±3 |

| | | POINT | | |
|---|---|---|---|---|
| | | 51A | 51B | 51C |
| ERROR IN COORDINATE AND ATTITUDE | gx | ±0.4 | ±4.5 | ±8.6 |
| | gy | ±0.1 | ±0.2 | ±0.4 |
| | gz | ±1 | ±1.8 | ±2.6 |
| | gp | ±3 | ±3 | ±3 |
| | gya | ±1 | ±1 | ±1 |
| | gr | ±3 | ±3 | ±3 |

| ERROR IN COORDINATE AND ATTITUDE | | POINT | |
|---|---|---|---|
| | | 51A | 51B |
| | gx | ±0.4 | ±0.4 |
| | gy | ±0.1 | ±0.1 |
| | gz | ±1 | ±1 |
| | gp | ±3 | ±3 |
| | gya | ±1 | ±1 |
| | gr | ±3 | ±3 |

FIG. 8C

| COORDINATE AND ATTITUDE | | 51B |
|---|---|---|
| | x | 5 |
| | y | −5 |
| | z | −40 |
| | pitch | 0 |
| | yaw | 0 |
| | roll | 0 |

| | | POINT | |
|---|---|---|---|
| | | 51A | 51B |
| ERROR IN COORDINATE AND ATTITUDE | gx | ±0.4 | ±0.4 |
| | gy | ±0.1 | ±0.1 |
| | gz | ±1 | ±1 |
| | gp | ±3 | ±3 |
| | gya | ±1 | ±1.9 |
| | gr | ±3 | ±3 |

| POINT | DETECTION AREA INFORMATION |
|---|---|
| 51B IN FIG. 6 | 3x |
| 51C IN FIG. 6 | x |
| 51B IN FIG. 7 | 5x |
| 51C IN FIG. 7 | 2x |
| 51B IN FIG. 8 | x |
| 51B IN FIG. 9 | 2x |

TARGET DETECTION APPARATUS AND TARGET DETECTION METHOD

TECHNICAL FIELD

The present invention relates to a target detection apparatus and a target detection method.

BACKGROUND

An image processing system that detects a traffic indicator from image data on a scene ahead of a vehicle is conventionally known (Japanese Patent Application Publication No. 2007-241469). Japanese Patent Application Publication No. 2007-241469 detects the position and attitude of a vehicle to thereby predict the position of a traffic indicator, determines an image processing area within image data based on the predicted position, and detects the traffic indicator from the image processing area. The image processing system thus decreases the image processing load.

The image processing system of Japanese Patent Application Publication No. 2007-241469, however, does not consider error in the detected position and attitude of the vehicle when determining the image processing area. The error is affected greatly by the surrounding situation of the vehicle. If the error is large, the traffic indicator will be outside the image processing area and therefore will be undetectable. On the other hand, setting an excessively large image processing area increases the possibility of erroneously detecting an object other than the traffic indicator.

SUMMARY

The present invention has been made in consideration of the above circumstances, and has an object to provide a target detection apparatus and a target detection method capable of accurate target detection.

A target detection apparatus according to an aspect of the present invention acquires an image by imaging surroundings of a vehicle, detects a self-position of the vehicle based on an amount of movement of the vehicle from an initial position of the vehicle, and estimates a relative position of a target, which is located around the vehicle, with respect to the vehicle based on the self-position and information on a position of the target on a map. The target detection apparatus sets a detection area for the target within the image based on the relative position of the target with respect to the vehicle, and detects the target from the detection area. The target detection apparatus estimates error contained in the self-position based on the amount of movement of the vehicle from the initial position, and adjusts a size of the detection area for the target according to the error.

BRIEF DESCRIPTION OF THE DRAWINGS

FIG. 5($a$) is a graph showing the relation between errors in the coordinates of the vehicle 51 and an amount (distance) by which the vehicle 51 moves from a terrestrial landmark in a travelling direction, and FIG. 5($b$) is a graph showing the relation between an amount (angle) by which the vehicle 51 moves from the terrestrial landmark in each rotational direction (a roll direction, a pitch direction, a yaw direction) and errors in an attitude of the vehicle 51;

FIG. 6($a$) is a diagram showing vehicles 51A to 51C travelling on a straight road LD1 alongside which terrestrial landmarks LM1 to LM3 are located, FIG. 6($b$) is a table showing errors estimated by the error estimator 16, and FIG. 6($c$) is a table showing self-positions detected by the self-position detector 12;

FIG. 7($a$) is a diagram showing vehicles 51A to 51C travelling on the straight road LD1 alongside which the terrestrial landmark LM1 is located, and FIG. 7($b$) is a table showing errors estimated by the error estimator 16;

FIG. 8($a$) is a diagram showing vehicles 51A and 51B travelling on a curved road LD2 alongside which terrestrial landmarks LM1 and LM2 are located, FIG. 8($b$) is a table showing errors estimated by the error estimator 16, and FIG. 8($c$) is a table showing self-positions detected by the self-position detector 12;

FIG. 9($a$) is a diagram showing vehicles 51A and 51B travelling on the curved load LD2 alongside which a terrestrial landmark LM1 is located, and FIG. 9($b$) is a table showing errors estimated by the error estimator 16;

DETAILED DESCRIPTION OF THE EMBODIMENTS

Hereinbelow, embodiments of the present invention are described with reference to the drawings. The same components are denoted by the same reference numerals and are not described to avoid repetitive description.

First Embodiment

Figure 1:
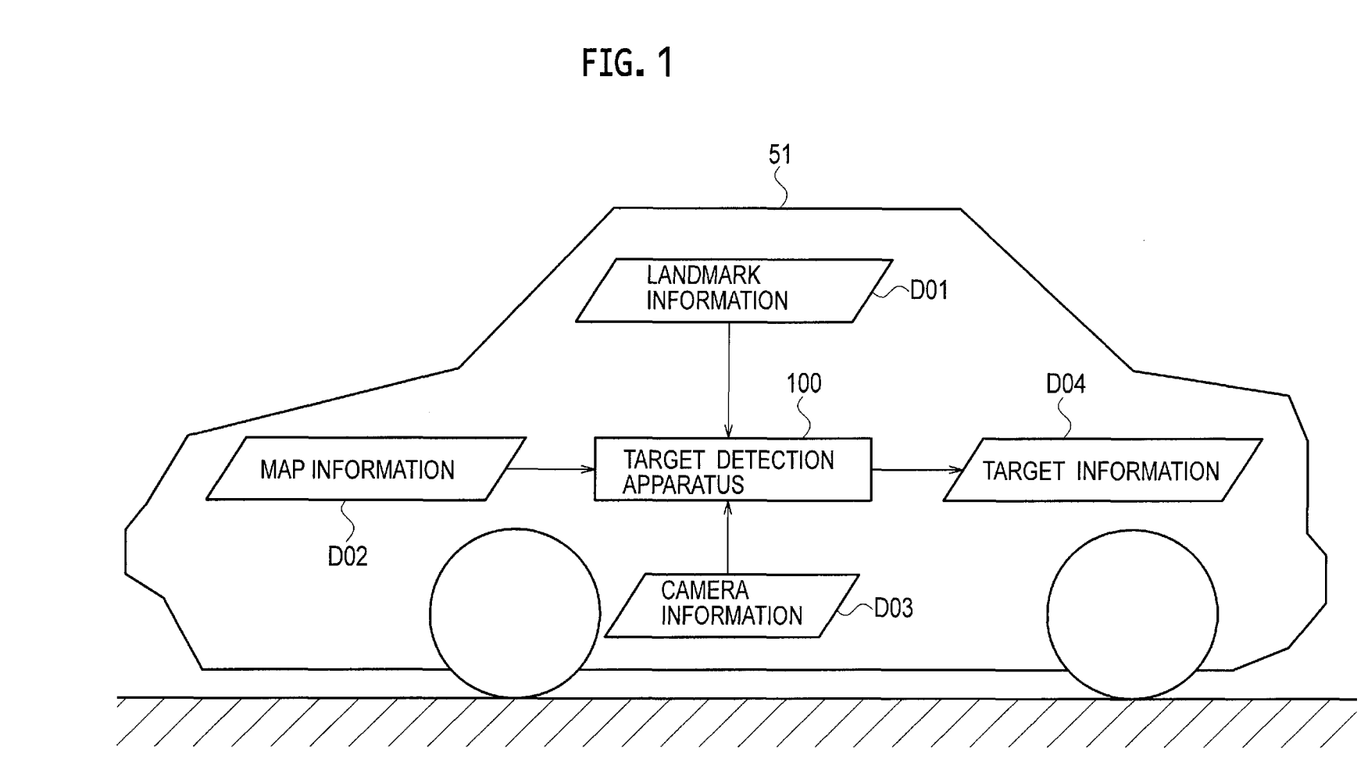
FIG. 1 is a block diagram illustrating information inputted to and outputted from a target detection apparatus 100 according to an embodiment.

With reference to FIG. 1, a description is given of information inputted to and outputted from a target detection apparatus 100 of the present embodiment. The target detection apparatus 100 detects a target placed near a road, from an image taken by an imager (camera) mounted in a vehicle 51. The target is fixed onto the ground and includes, for example, a traffic signal and a road sign. In the embodiments herein, a traffic signal is used as an example.

The target detection apparatus 100 receives input of map information D02, landmark information D01, and camera information D03. The map information D02 contains positional information on a target, in which a position on a map and a position in an actual environment are associated with each other beforehand. The landmark information D01 is used to calculate the self-position of the vehicle 51 in the actual environment. Landmarks include a characteristic object on the ground (terrestrial landmarks) and a Global Positioning System (GPS) satellite that transmits GPS signals receivable by the vehicle 51. In the first embodiment, a terrestrial landmark is used as an example. The landmark information D01 contains, for example, positional information on terrestrial landmarks. The camera information D03 is used to extract an image of the surroundings (e.g., the front) of the vehicle 51 from the imager. Based on these pieces of information D01 to D03, the target detection apparatus 100 outputs a result of recognition of a traffic signal, which is an example of the target, as traffic signal information D04.

Figure 2:
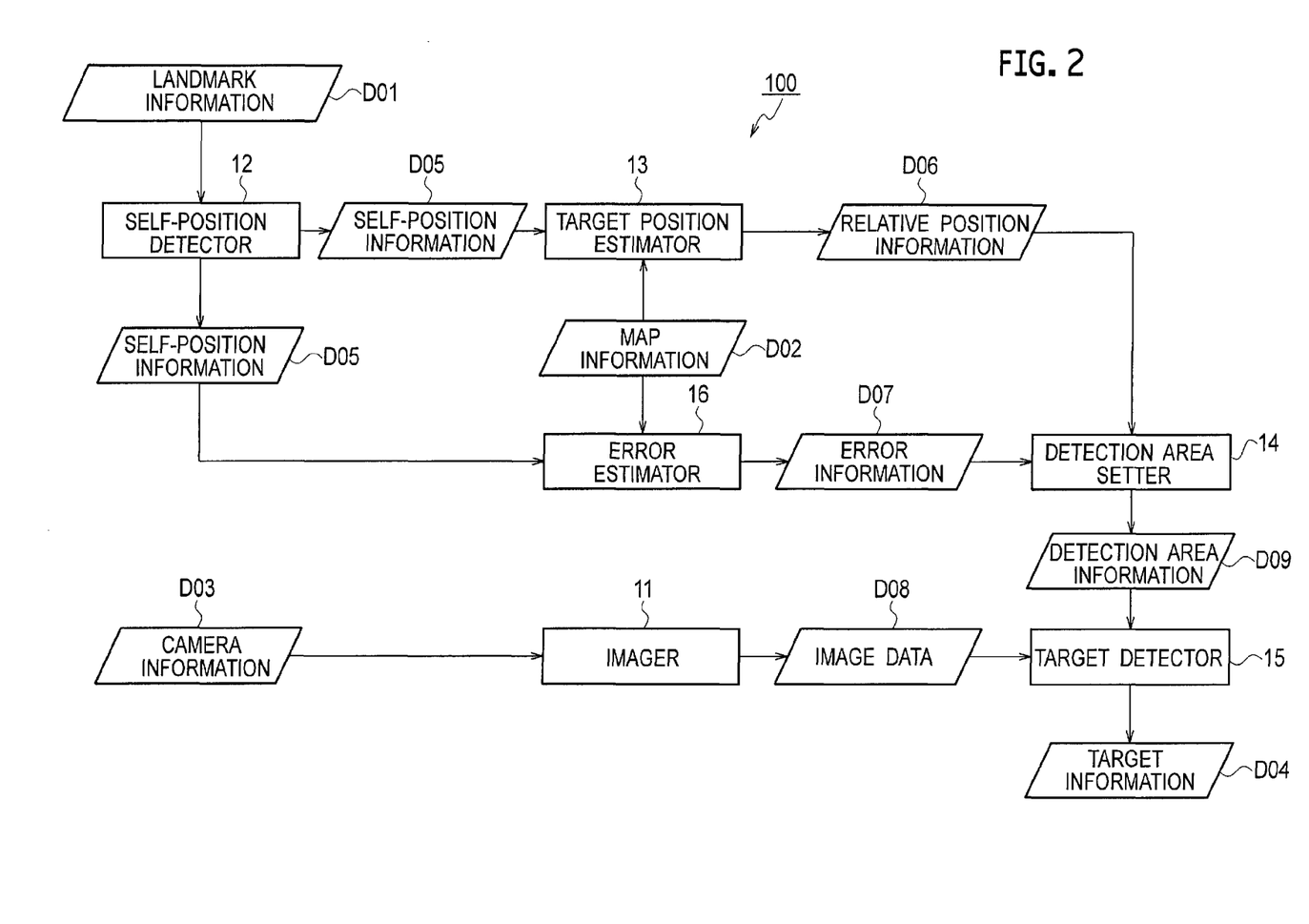
FIG. 2 is a block diagram illustrating the configuration of the target detection apparatus 100 according to the embodiment and a dataflow therein.

With reference to FIG. 2, the configuration of the target detection apparatus 100 according to the present embodiment and a dataflow therein are described. The target detection apparatus 100 includes an imager 11, a self-position detector 12, a target position estimator 13, a detection area setter 14, a target detector 15, and an error estimator 16.

The imager 11 is mounted in the vehicle 51 and acquires an image by imaging the surroundings of the vehicle 51. The imager 11 is a camera including a solid-state image pickup element, for example, a CCD and a CMOS, and acquires an image on which image processing can be performed. The imager 11 sets its angle of view for the image and vertical and horizontal camera angles based on the camera information D03, and outputs an acquired image as image data D08.

The self-position detector 12 detects the self-position of the vehicle 51 based on the amount of movement of the vehicle 51 from an initial position thereof on the map information D02, the initial position being based on the landmark information D01. The landmark information D01 indicates, for example, the relative position of a terrestrial landmark (a store, a sight, or a sightseeing spot), detected by a sensor such as an in-vehicle camera or a laser radar, with respect to the vehicle 51. In the map information D02, positional information on the terrestrial landmark is preregistered. The self-position detector 12 can detect the self-position of the vehicle 51 by checking the landmark information D01 and the relative position information on the terrestrial landmark against each other. Herein, the "position" includes coordinates and an attitude. To be more specific, the position of a terrestrial landmark includes the coordinates and attitude of the terrestrial landmark, and the position of the vehicle 51 includes the coordinates and attitude of the vehicle 51. As self-position information D05, the self-position detector 12 outputs the coordinates (x, y, z) represented in a reference coordinate system and the attitude components (pitch, yaw, and roll) in the rotational directions of the respective coordinate axes.

The target position estimator 13 estimates the relative position of a target with respect to the vehicle 51 based on the map information D02 and the self-position information D05. In the map information D02, the positional information (coordinates information) on the target is preregistered. The relative coordinates of the target to the vehicle can be obtained from the coordinates of the target and the coordinates and attitude of the vehicle 51. The target position estimator 13 outputs the estimated relative coordinates of the target as relative position information D06.

The error estimator 16 estimates errors contained in the self-position detected by the self-position detector 12, based on the amount of movement of the vehicle from the initial position. A detailed description of the error estimator 16 will be given later with reference to FIGS. 5 to 9.

The detection area setter 14 sets a target detection area within an image, based on the relative position of the target. Because the imager 11 is fixed to the vehicle 51, a position on the image at which the target is likely to be imaged can be specified within the image when the angle of view of the imager 11 is determined. Based on this position on the image, the detection area setter 14 determines the target detection area within the image.

The detection area setter 14 adjusts the size of the target detection area according to the errors estimated by the error estimator 16. The detection area setter 14 outputs the detection area thus set and adjusted, as detection area information D09. A detailed description of the detection area setter 14 will be given later with reference to FIGS. 10 and 11.

The target detector 15 detects the target from the detection area set and adjusted. Specifically, the target detector 15 performs image processing for target detection on the image data D08 within the detection area. The image processing method is not limited. In an example where the target is a traffic signal, a traffic light in the traffic signal can be detected using synchronous detection processing based on the alternating cycle of commercial power supplies or using hue and shape similarity determination processing. Other known image processing may also be used for the target detection. Performing the image processing not on the entire image data D08, but only on a part thereof (the detection area) reduces the information processing load for the target detection, allowing quick target detection. The target detector 15 outputs a result of the target detection as the target information D04.

The self-position detector 12, the target position estimator 13, the error estimator 16, the detection area setter 14, and the target detector 15 can be implemented using a microcontroller having a CPU, a memory, and an input and output unit. Specifically, the CPU executes preinstalled computer programs to implement the multiple information processors (12 to 16) in the microcontroller. Part of the memory in the microcontroller forms map database storing the map information D02. The microcontroller may be used also as an ECU used for other vehicle controls (e.g., autonomous driving control).

Figure 3:
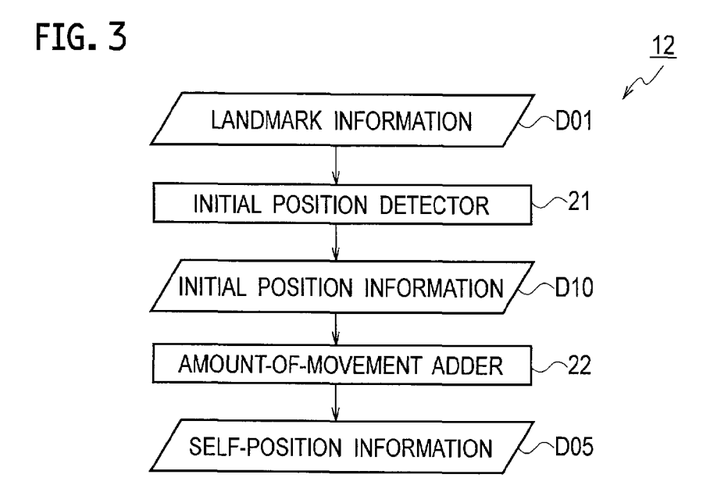
FIG. 3 is a block diagram illustrating the configuration of a self-position detector 12 in FIG. 2 and a dataflow therein.

With reference to FIG. 3, the configuration of the self-position detector 12 shown in FIG. 2 and a dataflow therein are described. The self-position detector 12 includes an initial position detector 21 and an amount-of-movement adder 22. The initial position detector 21 detects the initial position of the vehicle 51 using the landmark information D01. The initial position is a position based on which the self-position of the vehicle 51 is detectable, and is the position, i.e., the coordinates and attitude, of the vehicle 51 which can be directly obtained from the landmark information D01. Alternatively, there is a case where a vehicle position detection apparatus is placed alongside the road to detect the positions of vehicles travelling within its road section, allowing positional information on the vehicle 51 to be acquired through road-to-vehicle communications or the like. In such a case, the initial position detector 21 can acquire the position based on which the self-position of the vehicle 51 is detectable, by receiving the position of the vehicle 51 from the roadside vehicle position detection apparatus.

The amount-of-movement adder 22 accumulatively adds an amount of movement of the vehicle to the initial position detected by the initial position detector 21 and thereby calculates the self-position of the vehicle 51. In a case where, for example, a terrestrial landmark has been detected by a sensor, the self-position detector 12 detects information on the initial position as the self-position information D05 without the accumulative addition of the amount of movement of the vehicle. When no terrestrial landmark has been detected, the self-position detector 12 outputs, as the self-position information D05, information obtained by accumulatively adding the amount of movement of the vehicle to the initial position which has been detected most recently. The method used for the estimation of the amount of movement of the vehicle is not limited, and any known method may be used. For example, the amount-of-movement adder 22 may use an odometer, a radar, a gyroscopic sensor, a yaw-rate sensor, and a steer-angle sensor to estimate the amount of movement of the vehicle, i.e., an amount of change in the coordinates and attitude of the vehicle, per unit time.

In regard to the configuration of the self-position detector 12 in FIG. 3, the error estimator 16 in FIG. 2 estimates errors in the self-position based on the amount of movement of the vehicle 51 which is accumulatively added by the amount-of-movement adder 22. The amount of movement of the vehicle estimated by the amount-of-movement adder 22 is lower in accuracy than the initial position detected using a landmark. When such an amount of movement of the vehicle is accumulatively added to the initial position, errors contained in the self-position are also accumulatively added. Thus, errors contained in the self-position of the vehicle are greatly affected by the amount of movement from the initial position detected using a landmark. When errors are estimated based on the amount of movement from the initial position, the errors can be estimated accurately. Details for this will be given later with reference to FIGS. 5 to 9.

Figure 4:
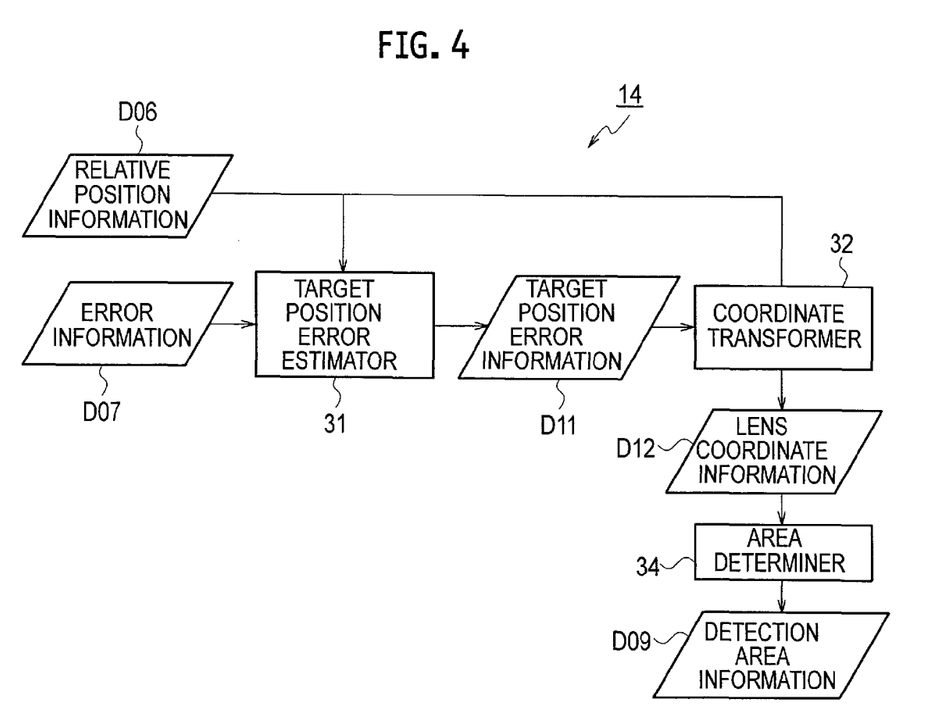
FIG. 4 is a block diagram illustrating the configuration of a detection area setter 14 in FIG. 2 and a dataflow therein.

With reference to FIG. 4, the configuration of the detection area setter 14 in FIG. 2 and a dataflow therein are described. The detection area setter 14 includes a target position error estimator 31, a coordinate transformer 32, and an area determiner 34.

The target position error estimator 31 estimates errors to be caused in the relative position of the target by the errors contained in the self-position. Specifically, the target position error estimator 31 receives input of the relative position information D06 and error information D07. Then, the target position error estimator 31 estimates errors which would be caused in the relative coordinates of the target with respect to the vehicle 51 if errors estimated by the error estimator 16 were caused in the coordinates and attitude of the vehicle 51. The target position error estimator 31 outputs the errors to be caused in the relative coordinates of the target, as target position error information D11.

The coordinate transformer 32 transforms the relative coordinates of the target and their errors into coordinates on the image in which the target is imaged. Specifically, the coordinate transformer 32 receives input of the relative position information D06 and the target position error information D11. Then, based on a lens optical system in the imager 11, the coordinate transformer 32 transforms the coordinates of the target in the three-dimensional coordinate system (x, y, z) into ones on the image in the two-dimensional coordinate system (x1, y1). The method for the coordinate transformation is not limited, and any known method may be used. The coordinate transformer 32 outputs the two-dimensional coordinates of the target assumed to contain no errors and the two dimensional coordinates of the target assumed to contain the maximum errors as lens coordinate information D12.

The area determiner 34 determines the size of a detection area based on the difference between the coordinates assumed to contain no errors and the coordinates assumed to contain the maximum errors, and determines the coordinates of the center of the detection area based on the coordinates assumed to contain no errors. Details for this will be given later with reference to FIG. 10. The size and center coordinates of the detection area are outputted as the detection area information D09.

With reference to FIGS. 5 to 9, a description is given of errors in the self-position estimated based on the amount of movement of the vehicle 51 which is accumulatively added by the amount-of-movement adder 22. The horizontal axis in FIG. 5(a) represents the amount of movement of the vehicle 51 from the initial position in a travelling direction (z direction), and the vertical axis in FIG. 5(a) represents errors (gx, gy, gz) contained in the coordinates of the vehicle 51. Specifically, gz denotes an error in the travelling direction of the vehicle 51, gx denotes an error in a width direction of the vehicle 51 and gy denotes an error in a height direction of the vehicle 51.

The errors (gx, gy, gz) contained in the coordinates of the vehicle 51 increase in proportion to the amount of movement from the initial position. When the amount of movement from the initial position is zero, the errors (gx, gy, gz) are also zero. Note that FIG. 5(a) does not consider errors contained in the initial position detected by the initial position detector 21. The coordinates of the vehicle 51 are calculated by accumulative addition of amounts of change in coordinates per unit time to the initial position. For this reason, when the amount of movement from the initial position is larger, larger amounts of change in coordinates are accumulatively added, increasing the errors to be contained in the coordinates of the vehicle 51. In relation to the amount of movement in the z direction (the travelling direction), the error in the width direction of the vehicle 51 (gx) is the largest, and the error in the height direction of the vehicle (gy) is the smallest.

Figure 5A:
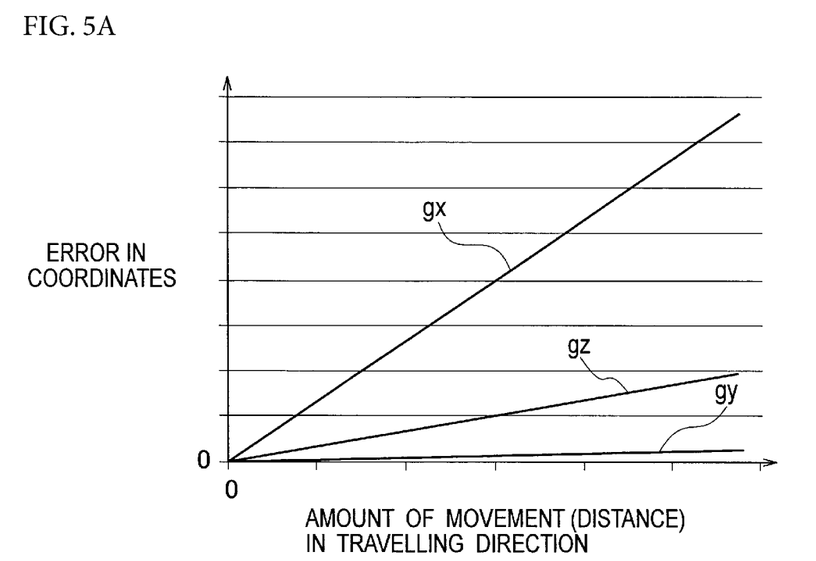
Figure 5B:
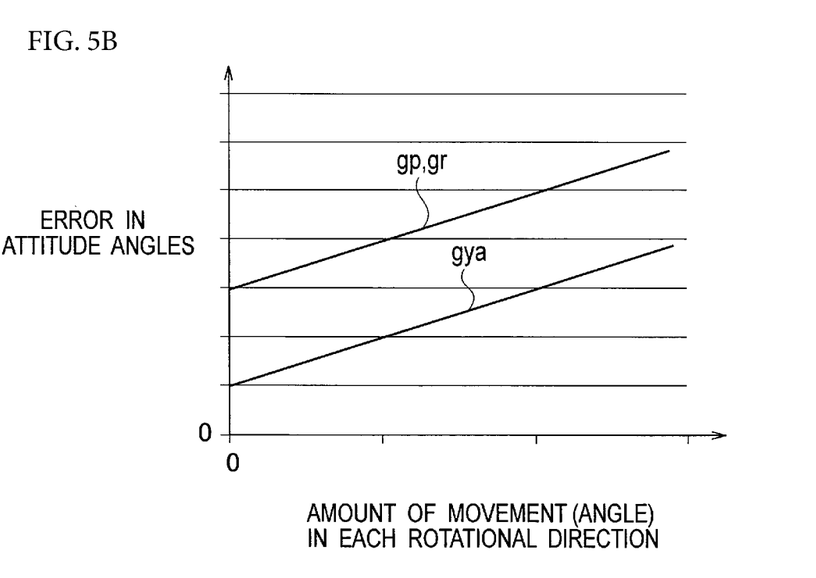

The horizontal axis in FIG. 5(b) represents an amount of movement of the vehicle 51 (an amount of angular change) in each rotational direction (the roll direction, the pitch direction, and the yaw direction) from the initial position, and the vertical axis in FIG. 5(b) represents errors (gr, gp, gya) contained in the attitude of the vehicle 51. Specifically, gr denotes an error in the roll direction of the vehicle 51, gp denotes an error in the pitch direction of the vehicle 51, and gya denotes an error in the yaw direction of the vehicle 51.

The errors (gr, gp, gya) contained in the attitude of the vehicle 51 increase in proportion to the amount of change in attitude from the attitude of the vehicle 51 at the initial position (i.e., an initial attitude). When the amounts of change from the initial attitude are zero, predetermined errors (gr, gp, gya) are caused. In other words, FIG. 5(b) considers errors contained in the initial attitude detected by the initial position detector 21. The attitude of the vehicle 51 is calculated by accumulative addition of the amounts of change in attitude per unit time to the initial attitude. For this reason, when the amounts of change from the initial attitude are large, larger amounts of change in attitude are accumulatively added, increasing the errors (gr, gp, gya) to be contained in the attitude of the vehicle 51. In relation to the amounts of change in the rotational directions, the errors in the roll direction (gr) and the pitch direction (gp) are the largest, and the error in the yaw direction (gya) is the smallest. When the vehicle 51 rotates in the yaw direction, only the error in the yaw direction (gya) is caused. The same is true of the roll direction and the pitch direction.

Next, the error estimation by the error estimator 16 and the self-position detection by the self-position detector 12 are described using specific examples of the road shapes and terrestrial landmarks shown in FIGS. 6 to 9.

Figure 6A:
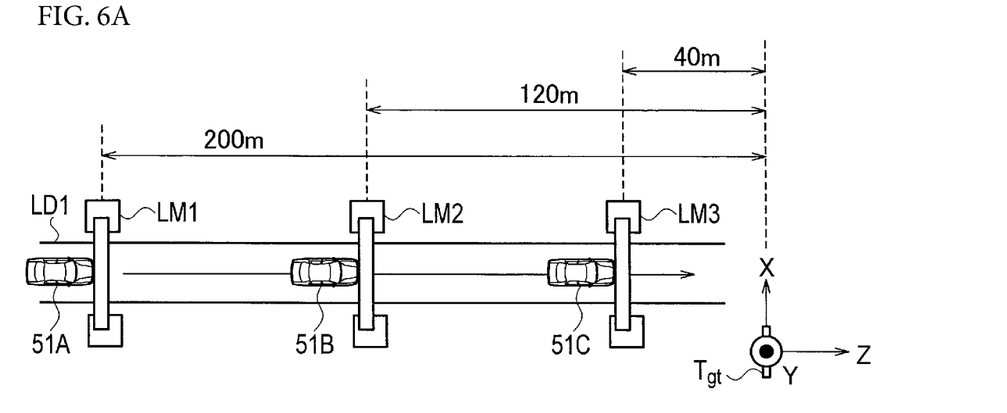
Figure 6B:
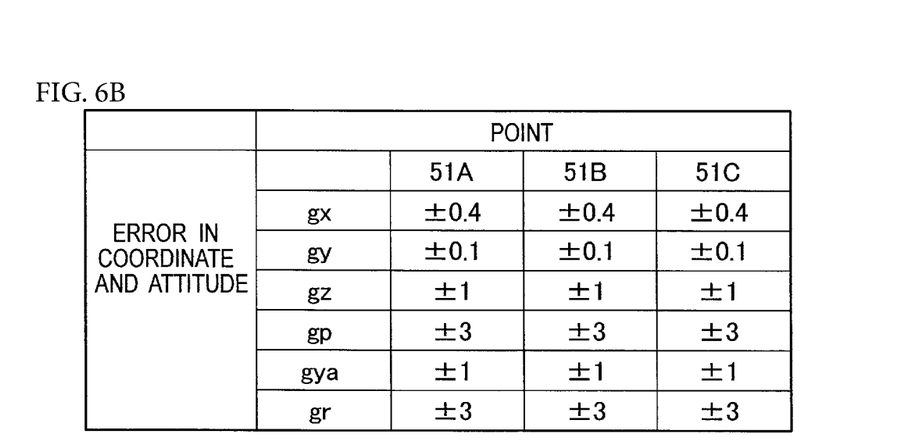
Figure 6C:
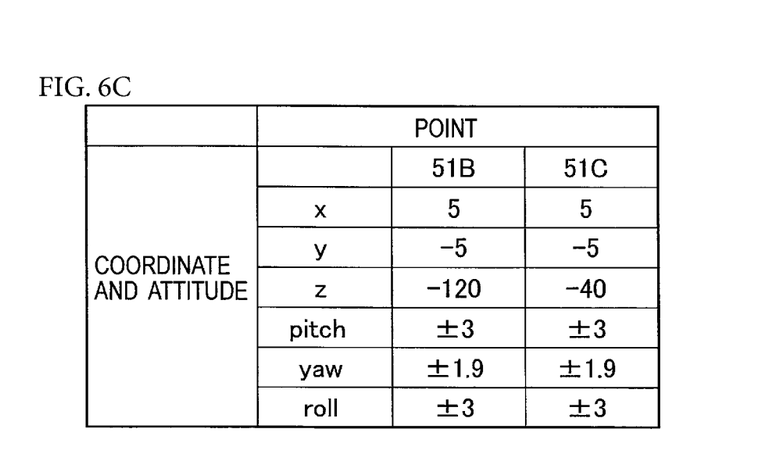

FIG. 6(a) shows vehicles 51A to 51C travelling on a straight road LD1 alongside which terrestrial landmarks LM1 to LM3 are placed. FIG. 6(b) is a table showing errors estimated by the error estimator 16, and FIG. 6(c) is a table showing self-positions detected by the self-position detector 12. The vehicle 51A shows the position of the vehicle making its closest approach to the terrestrial landmark LM1. Similarly, the vehicle 51B and the vehicle 51C show the positions of the vehicle making its closest approach to the terrestrial landmarks LM2 and LM3, respectively. A traffic signal, which is an example of a target Tgt, is away from the vehicles 51A, 51B, and 51C by 200 m, 120 m, and 40 m, respectively.

At each of the points of the vehicles 51A to 51C, the self-position detector 12 can calculate the self-position by using the initial position of the vehicle 51 as it is without accumulative addition of the amount of movement of the vehicle. Thus, as shown in FIG. 6(b), errors estimated by the error estimator 16 at the points of the vehicles 51A to 51C are equal to errors contained in the initial attitude detected by the initial position detector 21. Since the vehicle 51 is travelling on the straight road LD1, the self-position detected by the self-position detector 12 changes only in the coordinate (z) in the travelling direction (z direction), as shown in FIG. 6(c). The target Tgt is the origin of the coordinates shown in FIG. 6(c). The units are as follows: gx [m], gy [m], gz [m], gp [°], gya [°], gr [°], x [m], y [m], z [m], pitch [°], yaw [°], and roll [°].

Figure 7A:
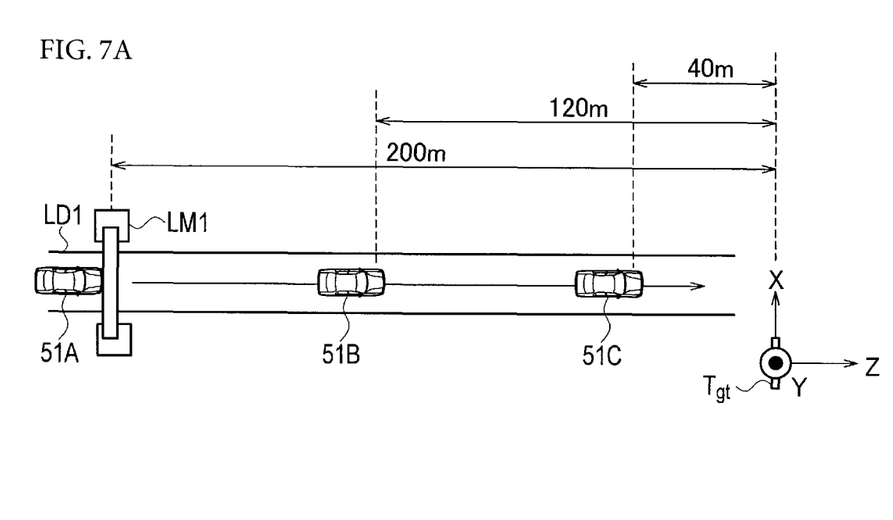
Figure 7B:
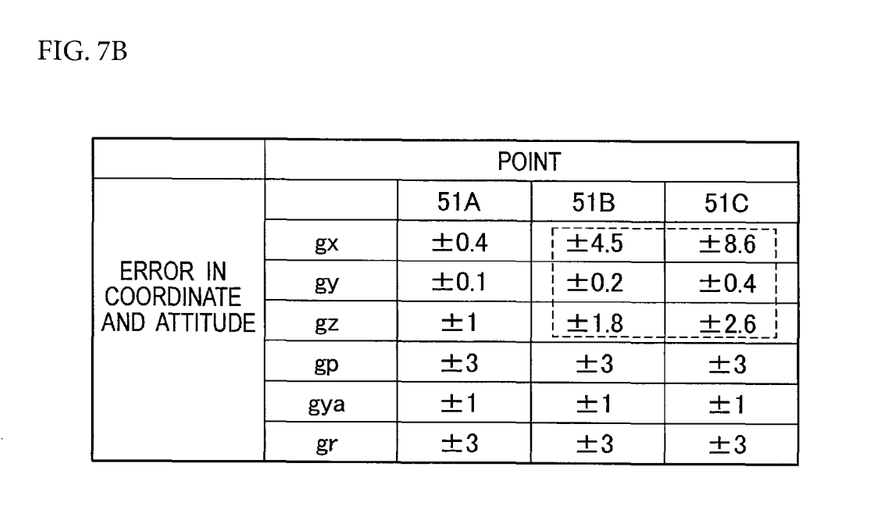

FIG. 7(a) shows another example where only the terrestrial landmark LM1 is placed alongside the straight road LD1. At the point of the vehicle 51A, the self-position detector 12 can calculate the self-position by using the initial position of the vehicle 51 as it is without accumulative addition of the amount of movement of the vehicle. Thus, as shown in FIG. 7(b), the same errors as those in FIG. 6(b) are caused in the coordinates and attitude at the point of the vehicle 51A. Because the terrestrial landmarks LM2 and LM3 are not placed, the self-positions at the vehicles 51B and 51C are calculated through accumulative addition of the amount of movement from the vehicle 51A. Thus, errors in the coordinates at the vehicle 51B and the vehicle 51C are different from those in FIG. 6(b). The error estimator 16 refers to the data shown in FIG. 5(a) and calculates errors in the coordinates based on amounts of movement from the vehicle 51A (80 m, 160 m). The longer the amount of movement from the vehicle 51A, the larger the errors in the coordinates (gx, gy, gz). Because the vehicle 51 does not move in the rotational directions in this example, errors in attitude at the vehicles 51B and 51C are the same as those in FIG. 6(b).

Figure 8A:
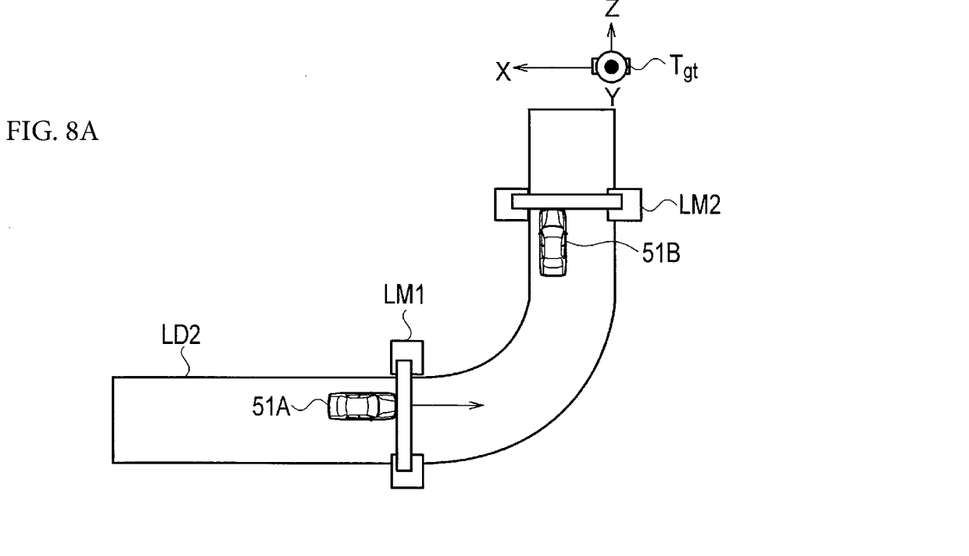
Figure 8B:
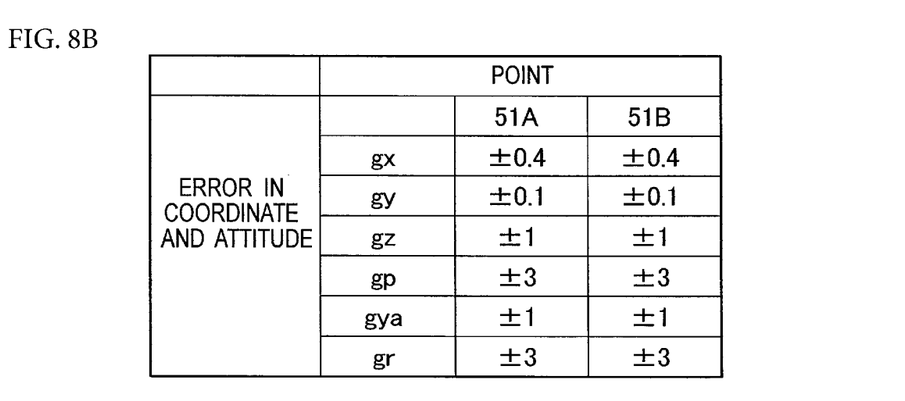
Figure 8C:
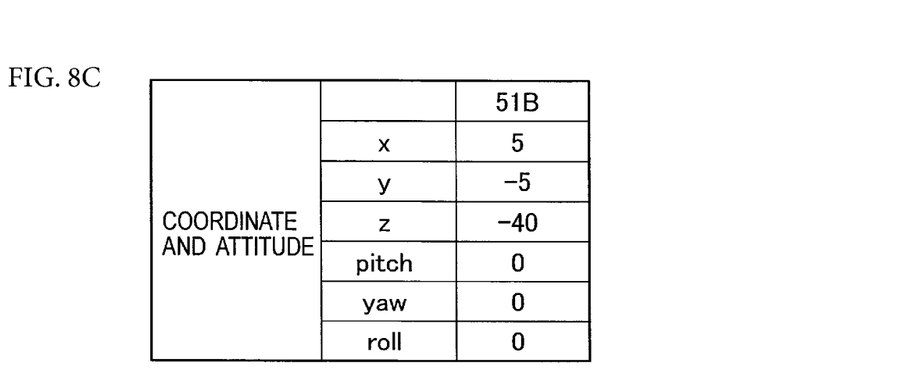

FIG. 8(a) shows the vehicles 51A and 51B travelling on a curved road LD2 alongside which the terrestrial landmarks LM1 and LM2 are placed. FIG. 8(b) is a table showing errors estimated by the error estimator 16, and FIG. 8(c) is a table showing self-positions detected by the self-position detector 12. The vehicles 51A and 51B show the positions of the vehicle making its closest approach to the terrestrial landmarks LM1 and LM2, respectively.

At each point of the vehicles 51A and 51B, the self-position detector 12 can calculate the self-position by using the initial position of the vehicle 51 as it is without accumulative addition of the amount of movement of the vehicle. Thus, as shown in FIG. 8(b), errors estimated by the error estimator 16 at the points of the vehicles 51A and 51B are equal to errors contained in the initial attitude detected by the initial position detector 21. The target Tgt is the origin of the coordinates shown in FIG. 8(c).

Figure 9A:
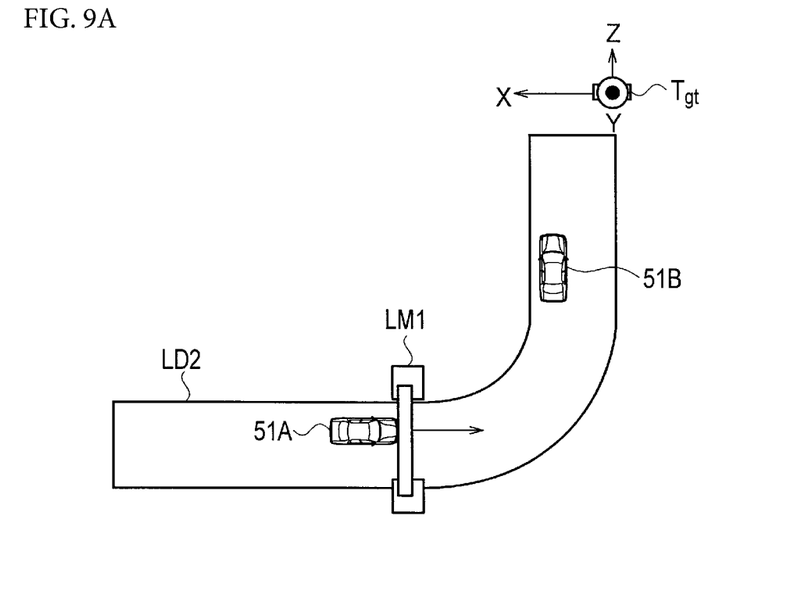
Figure 9B:
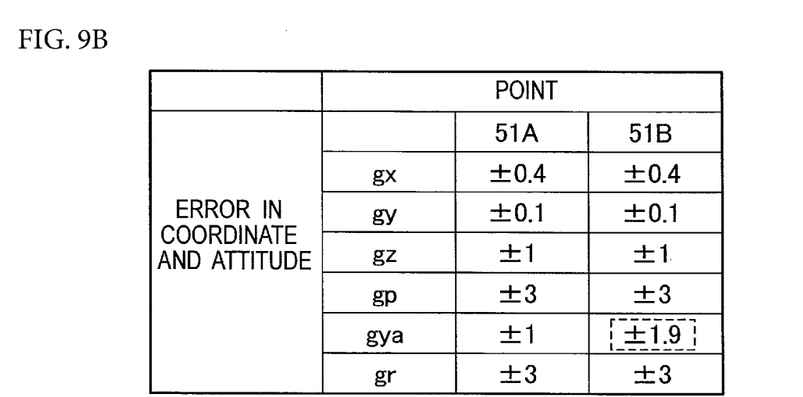

FIG. 9(a) shows another example where only the terrestrial landmark LM1 is placed alongside the curved road LD2. At the point of the vehicle 51A, the self-position detector 12 can calculate the self-position by using the initial position of the vehicle 51 as it is without accumulative addition of the amount of movement of the vehicle. Thus, as shown in FIG. 9(b), the same errors as those in FIG. 8(b) are caused in the coordinates and attitude at the point of the vehicle 51A. Because the terrestrial landmark LM2 is not placed, the self-position at the vehicle 51B is calculated through accumulative addition of the amount of movement from the vehicle 51A. Between the vehicle 51A and vehicle 51B, the vehicle is rotated in the yaw direction by 90°. The error estimator 16 refers to the data shown in FIG. 5(b) and calculates an error in the yaw direction based on the amount of movement from the vehicle 51A. As shown in FIG. 9(b), the error in the yaw direction (gya) is increased at the vehicle 51B. Between the vehicle 51A and the vehicle 51B, the coordinates of the vehicle also change in addition to the attitude of the vehicle. However, in this example, only the change in attitude is taken into consideration, and the change in coordinates is not taken into consideration.

Figure 10:
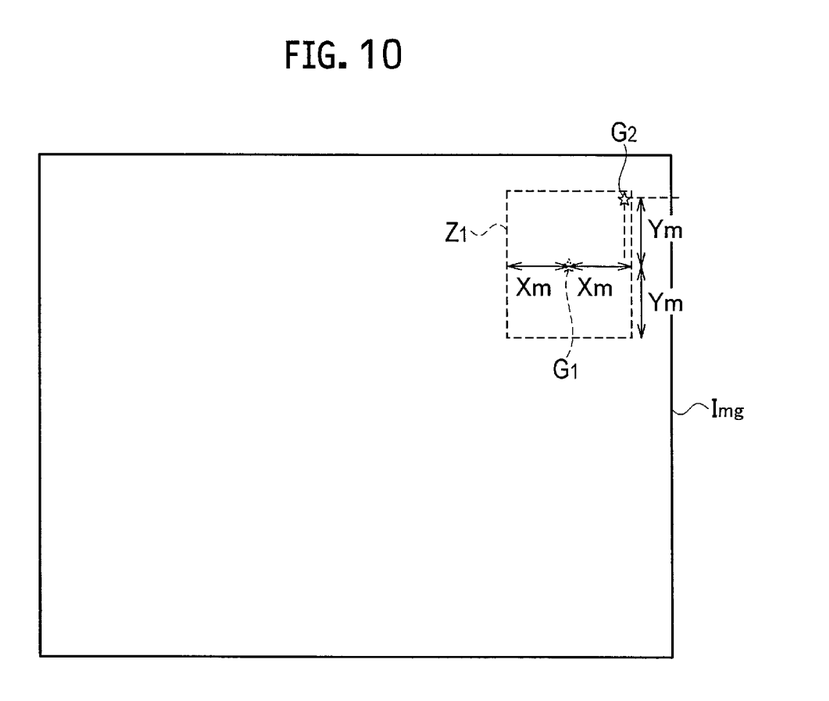
FIG. 10 is a plan view showing a two-dimensional coordinate system (x1, y1) on an image (Img), including target coordinates ($G_1$) assumed to contain no errors and target coordinates ($G_2$) assumed to contain the maximum errors.

With reference to FIG. 10, an example method of determining the size and center coordinates of a detection area is described. FIG. 10 is a plan view showing a two-dimensional coordinate system (x1, y1) on an image (Img). Coordinates ($G_1$) are two-dimensional coordinates of a target assumed to contain no errors, after the coordinate transformation by the coordinate transformer 32. Coordinates ($G_2$) are two-dimensional coordinates of a target assumed to contain the maximum errors, after the coordinate transformation by the coordinate transformer 32. The differences (Xm, Ym) between the coordinates ($G_1$) and the coordinates ($G_2$) correspond to errors contained in the relative coordinates of the target which have been subjected to the coordinate transformation by the coordinate transformer 32.

The detection area setter 14 determines a detection area ($Z_1$) having the coordinates ($G_1$) as its center coordinates and four sides obtained by adding, to the size of the target, a length of 2×Xm in the x direction and a length of 2×Ym in the y direction. With such a detection area ($Z_1$), even the maximum errors cause the coordinates ($G_2$) of the target to fall within the detection area ($Z_1$), making it unlikely for the target to be outside the detection area. Moreover, because the detection area ($Z_1$) is not increased excessively, erroneous detection of an object other than the target is unlikely, and also, detection of the target can be achieved with less computing load.

Alternatively, the detection area setter 14 may select a detection area ($Z_1$) having the closest size out of a plurality of predetermined detection areas ($Z_1$) of different sizes.

Figure 11:
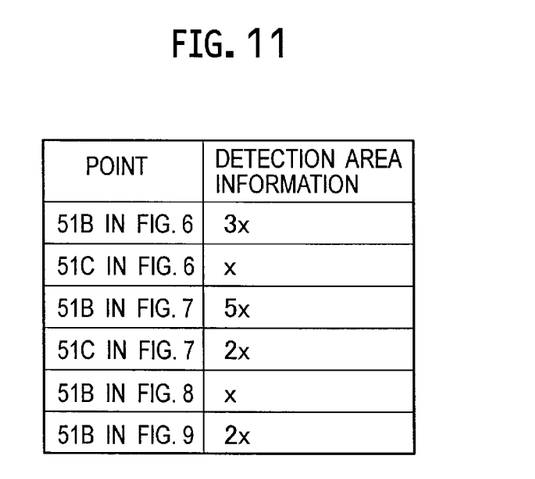
FIG. 11 is a table comparing the sizes of a detection area ($Z_1$) shown in FIG. 10.

With reference to FIG. 11, the detection areas ($Z_1$) in the examples shown in FIGS. 6 to 9 are compared in size. Here, the size of the detection area ($Z_1$) at the vehicle 51C in FIG. 6 and at the vehicle 51B in FIG. 8 is set as the reference (x). The vehicle 51B in FIG. 6 is the same as the vehicle 51C in FIG. 6 in the errors contained in the self-position (coordinates and attitude), but is different from the vehicle 51C in FIG. 6 in the distance to the target. Thus, the size of the detection area ($Z_1$) at the vehicle 51B in FIG. 6 is three times the reference value (x). Due to the absence of a terrestrial landmark, the vehicle 51B in FIG. 7 has errors caused by the accumulative addition of the amount of movement. For this reason, the size of the detection area ($Z_1$) is further increased to five times the reference value (x). At the vehicle 51C in FIG. 7, the errors caused by the accumulative addition of the amount of movement increases even more, but the distance to the target decreases. Thus, the size of the detection area ($Z_1$) decreases to twice the reference value (x). Similarly, the vehicle 51B in FIG. 9 has errors caused by the accumulative addition of the amount of movement; therefore, the size of the detection area ($Z_1$) is twice the reference value (x).

As described above, when the distance to the target is long, the errors in the yaw direction and the pitch direction (gya, gp) are significant, and therefore, the detection area needs to be large. On the other hand, when the distance to the target is short, the errors in the coordinates (gx, gy, gz) are significant, and therefore, the size of the detection area ($Z_1$) differs depending on whether the landmark information is present or absent.

Figure 12:
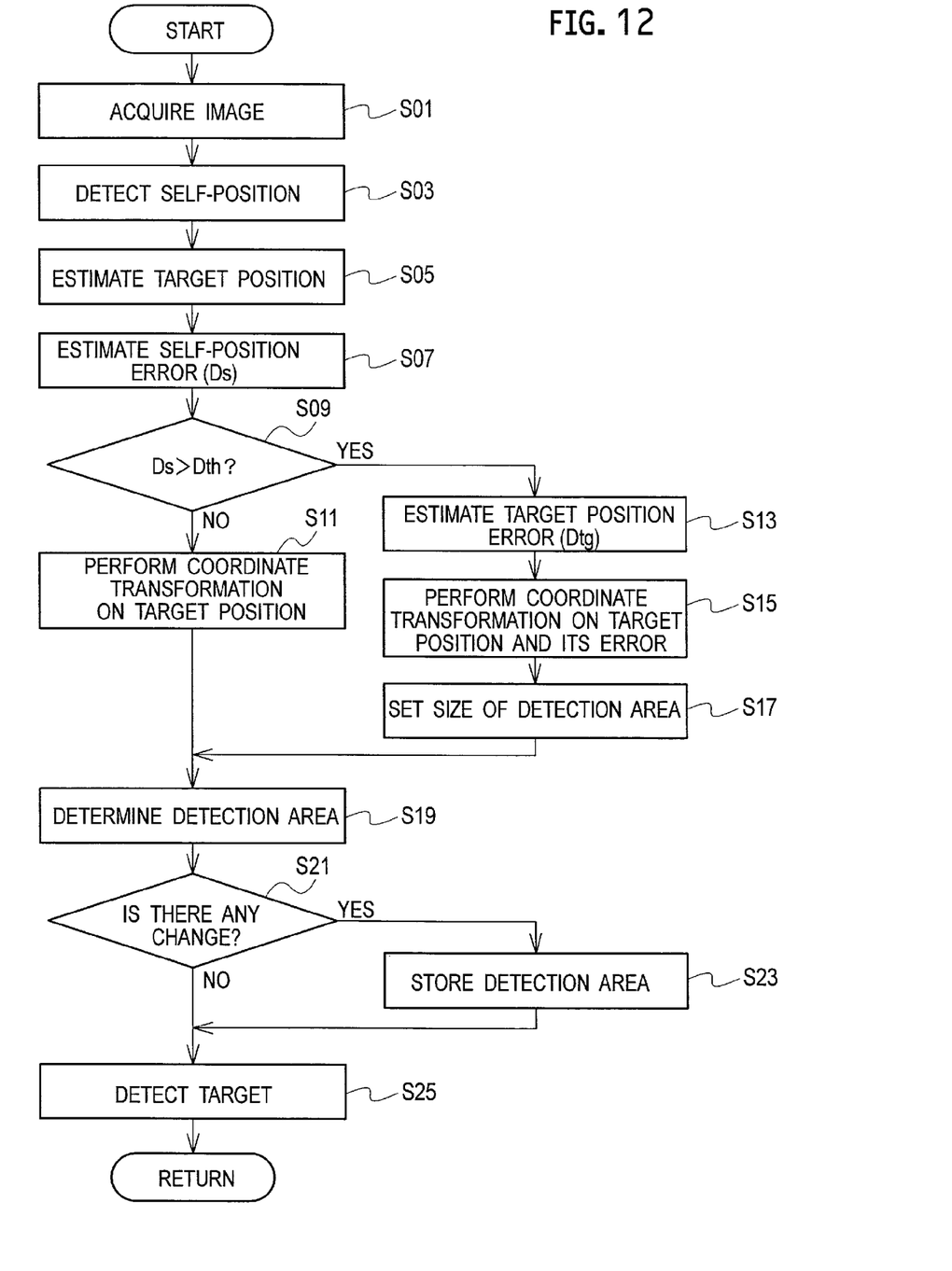
FIG. 12 is a flowchart showing an example of a target detection method using the target detection apparatus 100.

With reference to FIG. 12, an example of a target detection method using the target detection apparatus 100 is described.

In Step S01, the imager 11 acquires an image by imaging the surroundings of the vehicle 51 based on the camera information D03. In Step S03, the self-position detector 12 obtains an initial position of the vehicle 51 from the landmark information D01, detects the self-position of the vehicle based on an amount of movement of the vehicle 51 from the initial position, and outputs the detected self-position as the self-position information D05.

In Step S05, based on the map information D02 and the self-position information D05, the target position estimator 13 estimates the relative position of the target with respect to the vehicle 51. In Step S07, based on the self-position detected in Step S03, the error estimator 16 estimates error (Ds) contained in the self-position. To be more specific, by reference to FIGS. 5(a) and 5(b), the error estimator 16 estimates errors (gx, gy, gz, gr, gp, gya) contained in the self-position of the vehicle 51 according to amounts of movement (distance and angle) from the initial position.

In Step S09, it is determined whether the estimated error (Ds) is larger than threshold (Dth) predetermined. When the error (Ds) is larger than the threshold (Dth) (YES in S09), large errors are caused in the relative position of the target. Then, there is a high necessity for the detection area ($Z_1$) to be adjusted in size according to the errors. Thus, in Step S13, the target position error estimator 31 estimates errors caused in the relative position of the target by the errors contained in the self-position.

The threshold (Dth) can be set for each of the errors contained in the coordinates of the vehicle (gx, gy, gz) and each of the errors contained in the attitude of the vehicle (gr, gp, gya). Then, when any one of these errors is larger than its threshold, an affirmative determination (YES) is made in Step S09. Alternatively, an affirmative determination (YES) may be made in Step S09 only when all of the errors are larger than their thresholds.

In Step S15, as shown in FIG. 10, the coordinate transformer 32 transforms the relative coordinates of the target and their errors into coordinates (x1, y1) on the image (Img) of the target. In Step S17, as shown in FIG. 11, the area determiner 34 sets the size of the detection area ($Z_1$) based on the differences (Xm, Ym) between the coordinates ($G_1$) assumed to contain no errors and the coordinates ($G_2$) assumed to contain the maximum errors. In Step S19, the area determiner 34 determines the center coordinates of the detection area ($Z_1$) based on the coordinates ($G_1$) assumed to contain no errors. The detection area ($Z_1$) is thus determined.

Meanwhile, when the error (Ds) is equal to or smaller than the threshold (Dth) (NO in S09), small errors are caused in the relative position of the target. Then, there is a low necessity for the detection area ($Z_1$) to be adjusted in size according to the errors. Thus, in Step S11, the coordinate transformer 32 performs coordinate transformation on the relative coordinates of the target estimated in Step S05 and obtains the coordinates ($G_1$) assumed to contain no errors. In Step S19, the area determiner 34 determines the center coordinates of the detection area ($Z_1$) based on the coordinates ($G_1$) assumed to contain no errors. The size of the detection area ($Z_1$) in this case is a predetermined value, which is for example the reference value (x) in FIG. 11. In other words, when the error (Ds) is equal to or smaller than the threshold (Dth), the detection area ($Z_1$) is determined with its size not adjusted according to the error (Ds).

In Step S21, the area determiner 34 determines whether the amount of change in the error (Ds) between the previous error and the current error is equal to or larger than a predetermined reference value. When the amount of change in the error (Ds) is equal to or larger than the predetermined value (YES in S21), the flow proceeds to Step S23 in which the area determiner 34 stores the amount of size adjustment to the detection area in the memory, as an example of the detection area information D09. When the amount of change in the error (Ds) is smaller than the predetermined reference value (NO in S21), the area determiner 34 does not update the amount of size adjustment to the detection area. Then, in Step S25, the target detector 15 performs image processing for target detection on the image data D08 within the detection area set and adjusted.

The target detection apparatus according to the first embodiment described above offers the following advantageous effects.

The target detection apparatus estimates the error (Ds) contained in the self-position of the vehicle 51 based on the amount of movement of the vehicle from its initial position, and then adjusts the size of the target detection area ($Z_1$) according to the error (Ds). The target detection area ($Z_1$) can thus be adjusted in size with the error (Ds) taken into consideration. Thus, even when the error (Ds) is greatly affected by the environment of the vehicle, the size of the detection area ($Z_1$) can be set appropriately according to the error (Ds). For example, the detection area is increased in size when the error is large, so that the target will unlikely be outside the detection area. Conversely, the detection area is decreased in size when the error is small, so that an object other than the target will unlikely be erroneously detected. Image processing load is also reduced. When the size of the target detection area is thus appropriately adjusted with the error contained in the self-position of the vehicle taken into consideration, the target can be detected accurately. Even when there is an error, the target can be detected with less computation load within a detection area which is defined as small as possible but large enough to recognize the target.

The error (Ds) contained in the self-position of the vehicle 51 is greatly affected by the amount of movement which is accumulatively added to an initial position detected using a landmark (e.g., the terrestrial landmarks LM1 to LM3). Thus, the error can be estimated accurately by error estimation that is based on the amount of movement from the initial position.

The self-position detector 12 can detect the self-position accurately by checking the positional information on a characteristic object on the ground (the terrestrial landmarks LM1 to LM3) and the map information D02 against each other. Thus, the error (Ds) can be accurately estimated based on the amount of movement from the landmark to the self-position.

As the self-position, the self-position detector 12 detects the coordinates of the vehicle and the attitude of the vehicle. The error estimator 16 estimates errors contained in the coordinates of the vehicle based on the amount of movement in the travelling direction of the vehicle, and estimates the errors contained in the attitude of the vehicle based on the amount of movement in the rotational directions of the vehicle. This enables accurate estimation of the error (Ds) contained in the self-position of the vehicle, and in turn, enables accurate estimation of error in the relative position of the target which is caused by the error (Ds).

The area determiner 34 retains the amount of size adjustment to the detection area when the amount of change in the error (Ds) is equal to or larger than the predetermined reference value. This allows retention of the latest detection area information D09.

Second Embodiment

A second embodiment is described taking an example where the self-position is detected using, instead of a landmark, a GPS satellite that transmits GPS signals receivable by the vehicle 51. The self-position detector 12 receives a GPS signal as the landmark information D01 and detects an initial position (initial coordinates and initial attitude) of the vehicle 51 from the GPS signal.

The vehicle 51 might not be able to receive GPS signals due to the environment of the vehicle, for example, when there are many buildings surrounding the vehicle to block the GPS signals. In such a case, the self-position detector 12 calculates the self-position of the vehicle by accumulatively adding the amount of movement of the vehicle to the initial position detected by the initial position detector 21.

The initial position detector 21 in FIG. 3 detects the initial position of the vehicle 51 using a GPS signal. The initial position is the position, i.e., the coordinates and attitude, of the vehicle 51 directly obtainable from the GPS signal. When no GPS signal is received, the amount-of-movement adder 22 calculates the self-position of the vehicle 51 by accumulatively adding the amount of movement of the vehicle to the initial position obtained by the GPS signal received most recently.

For example, when GPS signals are being received, the self-position detector 12 detects information on the initial position as the self-position information D05, without the accumulative addition of the amount of movement of the vehicle. When GPS signals are not being received, the self-position detector 12 outputs, as the self-position information D05, information on a position obtained by accumulatively adding the amount of movement of the vehicle to the initial position detected most recently.

In the examples shown in FIGS. 6(a) to 9(a), the positions of the vehicles 51A to 51C making their closest approach to the terrestrial landmarks LM1 to LM3, respectively, correspond to points at which the initial positions of the vehicle 51 are detected by reception of GPS signals.

Other configurations for the target detection apparatus 100 and the target detection method are the same as those in the first embodiment, and therefore not described to avoid repetitive description.

As described above, the self-position detector 12 detects the self-position by using the GPS satellite as a landmark, and the error estimator 16 estimates error based on the amount of movement from a vehicle position of most-recent reception of a signal transmitted from the GPS satellite, to the self-position. The initial position can be accurately detected by use of a GPS signal transmitted from the GPS satellite. The error (Ds) can be estimated accurately based on the amount of movement from reception of a GPS signal to the self-position.

The present invention has been described above using the embodiments. However, the present invention is not limited to what has been described above and can be variously modified and improved, as is apparent to those skilled in the art.

For example, the self-position detector 12 may detect the self-position using both of a terrestrial landmark and a GPS satellite as a landmark. In this case, the error estimator 16 may estimate the error (Ds) based on the amount of movement from either most-recent detection of a terrestrial landmark or most-recent reception of a GPS signal to the self-position.

When the vehicle 51 can communicate with a terrestrial landmark, the relative position of the terrestrial landmark and the vehicle 51 with respect to each other can be acquired by communication, as with the case of using a GPS satellite. In this case, the error estimator 16 may estimate the error (Ds) based on the amount of movement from most-recent reception of a position communicated from the terrestrial landmark, to the self-position.

There is a case where a vehicle position detection apparatus is installed alongside the road to detect the positions of vehicles travelling within its road section, enabling positional information on a vehicle to be acquired through road-to-vehicle communications or the like. In such a case, the self-position detector 12 may detect the self-position of the vehicle 51 by road-to-vehicle communications or the like with the roadside vehicle position detection apparatus. Then, the error estimator 16 may estimate the error (Ds) based on the amount of movement from most-recent reception of the vehicle position (initial position) communicated from the roadside vehicle position detection apparatus, to the self-position.

The invention claimed is:

1. A target detection apparatus comprising:
   a camera mounted in a vehicle and configured to acquire an image by imaging surroundings of the vehicle;
   a processor; and
   a memory coupled to the processor, the memory storing instructions which, when executed by the processor:
   detect a self-position of the vehicle based on an amount of movement of the vehicle from an initial position of the vehicle;
   estimate a relative position of a target, which is located around the vehicle, with respect to the vehicle based on the self-position and information on a position of the target on a map;
   specify an imaging position on the image at which the target is imaged, based on the relative position of the target with respect to the vehicle;
   set a detection area for the target based on the imaging position on the image;
   detect the target from the detection area;
   estimate error contained in the detected self-position based on the amount of movement of the vehicle from the initial position to the detected self-position; and
   adjust a size of the detection area for the target according to the estimated error.

2. The target detection apparatus according to claim 1, wherein the memory further comprises instructions to:
   detect the initial position of the vehicle by using a landmark; and
   calculate the self-position by accumulatively adding the amount of movement of the vehicle to the initial position; and estimate the estimated error based on the amount of movement of the vehicle from the initial position to the self-position of the vehicle.

3. The target detection apparatus according to claim 2, wherein the memory further comprises instructions to:
   detect the initial position by using a Global Positioning System satellite as the landmark; and
   estimate the estimated error based on the amount of movement of the vehicle from the initial position to the self-position corresponding to most-recent reception of a signal transmitted from the Global Positioning System satellite.

4. The target detection apparatus according to claim 1, wherein the memory further comprises instructions to:
   detect, as the self-position, coordinates of the vehicle and an attitude of the vehicle;
   estimate error contained in the coordinates of the vehicle based on an amount of movement of the vehicle in a travelling direction; and
   estimate error contained in the attitude of the vehicle in a rotational direction.

5. The target detection apparatus according to claim 1, wherein the memory further comprises instructions to:
   retain an amount of the adjustment to the size of the detection area when an amount of change in the estimated error is equal to or larger than a predetermined reference value.

6. A target detection method using a target detection apparatus comprising a camera mounted in a vehicle, the target detection method comprising:
   acquiring, using the camera, an image by imaging surroundings of a vehicle;
   detecting a self-position of the vehicle based on an amount of movement of the vehicle from an initial position of the vehicle;
   estimating a relative position of a target, which is located around the vehicle, with respect to the vehicle based on the self-position and information on a position of the target on a map;
   specifying an imaging position on the image at which the target is imaged, based on the relative position of the target with respect to the vehicle;
   setting a detection area for the target based on the imaging position on the image;
   estimating error contained in the self-position based on the amount of movement of the vehicle from the initial position to the self-position;
   adjusting a size of the detection area for the target according to the error; and
   detecting the target from the detection area.

\* \* \* \* \*